May 31, 1927.  
E. H. PITNEY  
1,630,633  
SIGNAL DEVICE  
Filed April 26, 1923  2 Sheets-Sheet 1
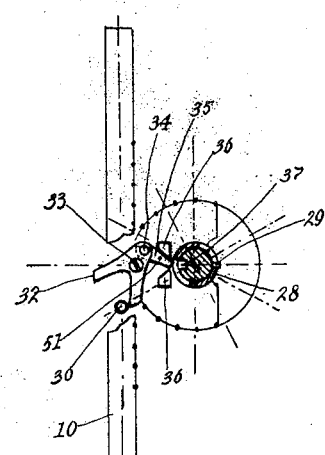
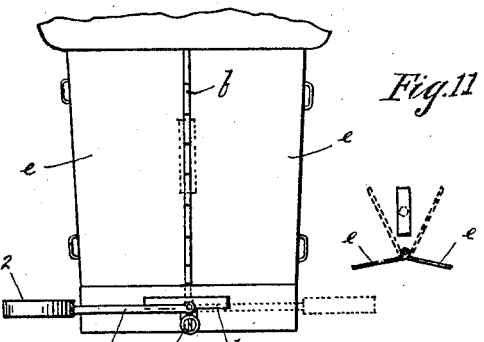
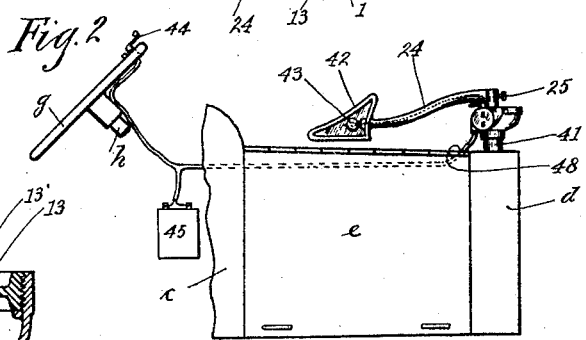
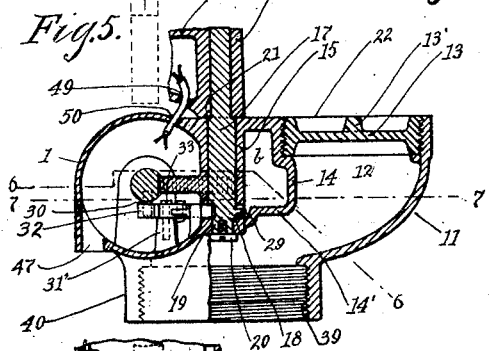
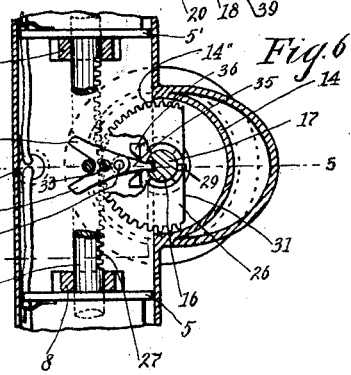
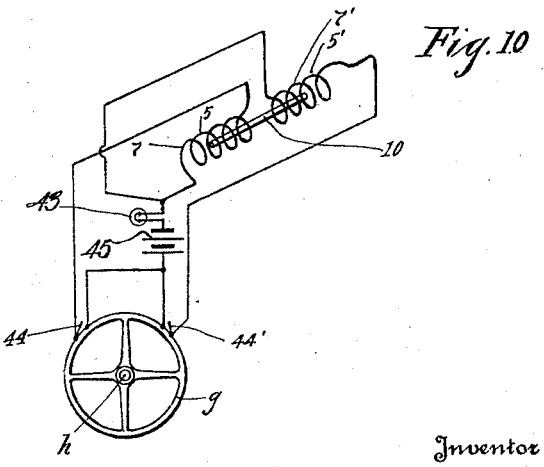
Inventor  
Earl H. Pitney  
by H. S. Johnson  
Attorney May 31, 1927.
E. H. PITNEY
1,630,633
SIGNAL DEVICE
Filed April 26, 1923    2 Sheets-Sheet 2
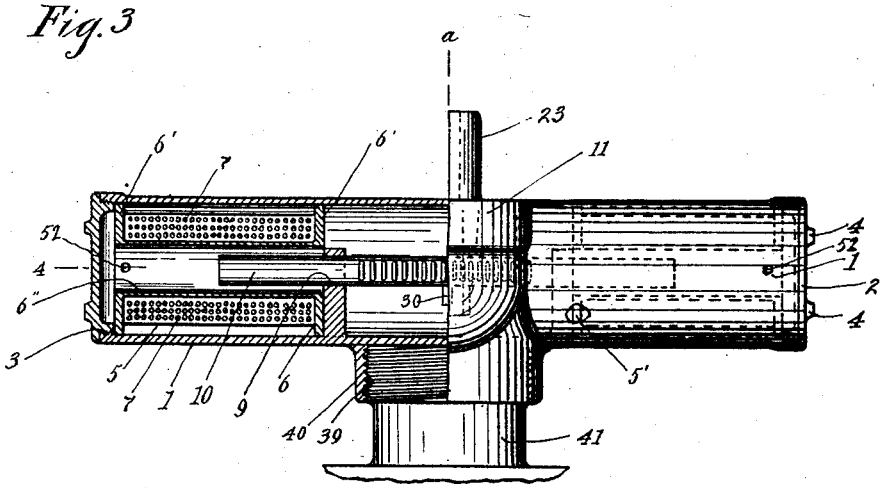
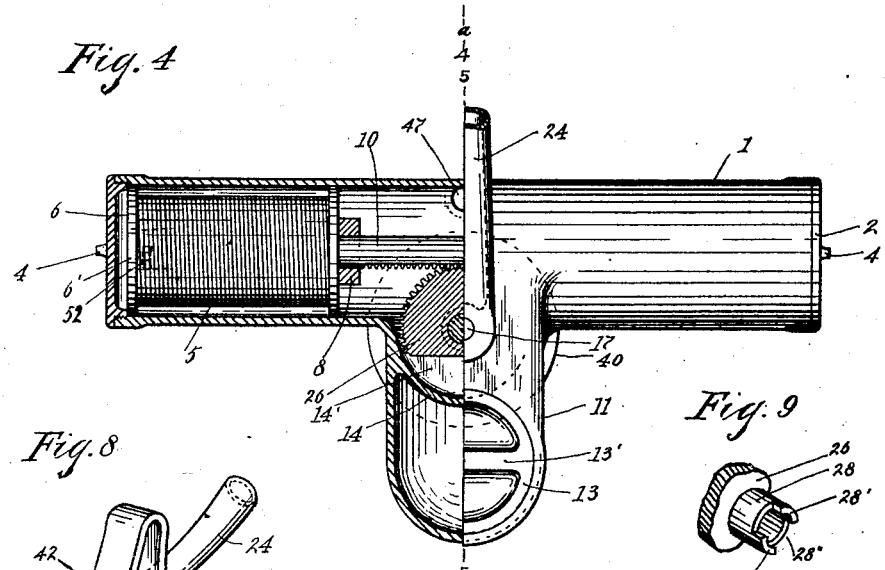
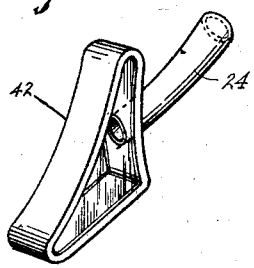
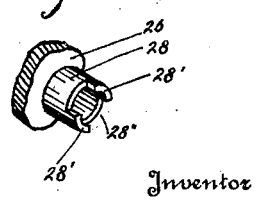
Inventor
Earl H. Pitney
By H. S. Johnson
Attorney Patented May 31, 1927.

1,630,633

UNITED STATES PATENT OFFICE.

EARL H. PITNEY, OF MINNEAPOLIS, MINNESOTA, ASSIGNOR OF ONE-HALF TO JAMES W. HAMILTON, OF ST. PAUL, MINNESOTA.

SIGNAL DEVICE.

Application filed April 26, 1923. Serial No. 634,742.

This invention relates to signal devices, specially adapted for use in connection with automobiles, to warn the public that a turning movement of the car, to the right or left, is about to occur, the invention having for one of its objects, to provide improved signaling means, specially adapted to be supported on the ordinary threaded inlet pipe of an automobile radiator, and involving special features of construction to conform to ordinary automobile hoods, which hoods are generally divided longitudinally, centrally of the machine, and are adapted to swing upwardly about a longitudinally disposed pivotable connection thereat.

A further object of the invention is the provision of improved signaling means for indicating the direction in which the machine is about to turn, wherein the movement of the significatory element of the device is controlled solely by a pair of oppositely disposed solenoids, which in turn may be rendered effective from a point adjacent the driver.

A further object of the invention is the provision of an improved electrically actuated device of the class described, which will be compact, cheap, and simple of construction, and which will be capable of being attached to the radiator of an automobile in a manner to receive warmth therefrom to prevent the oil in the mechanism from congealing in cold weather.

Other objects and advantages of the invention will be pointed out at opportune times, as this specification progresses, the invention consisting in the construction, combination, and arrangement of parts hereinafter described and specifically claimed.

In the accompanying drawings, forming part of this specification:

Figure 1, is a plan view of a radiator and hood of an automobile, showing my improved signaling device attached thereto.

Figure 2, is a side view of same.

Figure 3, is a front elevation of the invention, shown partly in section.

Figure 4, is a top view of Figure 3, shown partly in section on line 4—4 thereof.

Figure 5, is a sectional view on line 5—5 of Figure 6.

Figure 6, is a sectional view on line 6—6 of Figure 5.

Figure 7, is a diagrammatic view on line 7—7 of Figure 5.

Figure 8, is a perspective view of the head of the significatory device.

Figure 9, is a perspective view of a detail.

Figure 10, is a wiring diagram; and

Figure 11, is a view of a detail.

Referring to Figures 3 and 4 of the drawings, 1 designates an elongated horizontally disposed, preferably cylindrical casing, each end thereof being fitted with a closure 2, which closures have, respectively, threaded engagement 3 with the casing, and are provided externally with suitable lugs 4, whereby they may be manipulated to be screwed firmly in position. Fitting the interior of the casing are a pair of solenoids 5 and 5', respectively, one for each end thereof. Each of these solenoids comprises a cylindrical spool 6, having end flanges 6' joined together by a tubular body portion 6'', which body portion is concentric with the internal diameter of the casing, said spools being formed of non-conducting material, upon which are wound helices of wire 7 and 7', respectively, each of said helices being wound clockwise from their inner adjacent ends.

In the interior of the casing, one located adjacent the inner end of each of the solenoids to form a stop therefor, are the core supports 8, said supports having bores 9 concentric with the inner diameter of the casing 1 and adapted to slidably support a preferably wrought iron core 10, which core normally loosely extends a distance into the interior of the tubular body portion 6'' of the spool. The core normally extends symmetrically beyond either side of a center line $a—a$, midway between the ends of the casing. The casing is formed, symmetrically about the line $a—a$, with a laterally extending, hollow extension 11. This extension is formed with an upwardly facing circular inlet opening 12, having threaded engagement with a suitable closure 13, said closure being preferably formed with a transverse rib 13' to form a grip whereby it may be screwed firmly into said opening. The plane of the top of said extension is horizontally disposed and approximately coincident with the top edge of the casing 1, as shown in Figure 5, the cover 13 for said opening being preferably flush with the top of the extension.

The extension is further formed with a vertical semi-circular partition wall 14, which wall extends downwardly beyond the longitudinal axis of the core 10, and then inwardly to form the wall 14', which latter joins with the wall of the casing 1. The inner wall of the casing 1 is cut away at 14" to be in open communication with the chamber b, formed by the walls 14 and 14', as shown in Figure 6 of the drawing. Located approximately between the core 10 and the wall 14, and being concentric with the latter, is a vertically disposed hub 15, forming part of the casing and having a suitable vertical bore 16, wherein rotates the shaft 17. The shaft is formed at its lower extremity with a shoulder 18 and a reduced bearing portion 19, which latter is journaled in the wall 14', the shoulder 18 forming an end bearing in engagement with said wall. A suitable retaining screw 20, threaded in the end of the shaft portion 19, holds the shaft portion 17 rotatably secured in the casing.

The shaft 17 is further formed with a shoulder 21, which shoulder is positioned slightly above the level of the top 22 of the casing extension 11. The shaft extends vertically from said shoulder through a hub 23 forming part of a direction indicating arm 24. A suitable set screw 25, threaded in the hub 23 and adapted to engage the shaft 17, serves as an adjusting means, whereby the indicator arm may be adjusted circumferentially on said shaft.

Rotatably mounted on the shaft is the spur gear 26, which gear meshes with teeth 27 formed in the side of the core 10, thus constituting a gear rack, as is best shown in Figure 4 of the drawings. The gear is formed with a hub 28, extending between the hub 15 and the wall 14', and being cut away at opposite sides to form oppositely disposed segmental lugs 28'. Extending at right angles from the shaft 17 is a pin 29, which pin extends normally midway between the lugs 28' of the gear hub. Extending from the under side of the core 10, and located normally in lateral alinement with the pin 29, with respect to the longitudinal axis of the core, is a pin 30. This pin is located midway between the ends of the core. The periphery of the gear 26 is preferably cut away in a straight line to form an edge 31 parallel with the core, the lugs 28' being normally positioned symmetrically about a line drawn at right angles to the core and intersecting the axis of the shaft 17. Extending upwardly in the casing 1, is a boss 31', upon which is pivoted by a pivot pin 33 for rotation in a horizontal plane, a V-shaped cam member 32, the pivot pin 33 being located in a vertical plane coincident with the axis of the shaft 17 and extending at right angles to the core 10. The pivot 33 is further slightly offset laterally from the pin 30 of the core, as is best shown in Figure 6 of the drawings.

Pivoted to swing laterally to the cam member 32 by means of the vertical pivot pin 34, is the lock bar or lever member 35, which latter extends between oppositely disposed, stationary guide lugs 36, preferably integral with the casing.

The shaft 17 is further formed with a notch 37 adapted to receive the end of the lever member 35, when the cam member 32 is in its normal position, as indicated in Figure 6 of the drawings. The cam member is formed with two outwardly diverging arms 38, adapted to be engaged by the pin 30 of the core to move the cam about its pivot 30, responsive to a sliding movement of the core. Thus, when the core is slid in one direction, as shown in Figure 7, the cam member is caused to turn upon its pivot 33 (which latter constitutes a fulcrum), and thus withdraw the lock member 35 from the notch 37 in the shaft 17, whereby the shaft is rendered free to be rotated. A swinging movement of the arm 24 to the right or left will impart rotary movement to the shaft 17, and in turn a longitudinal sliding movement to the core in the bearings 9.

Obviously, the notches or spaces 28" between the lugs 28' in the gear hub will enable the gear to be freely rotated to a predetermined degree in either direction, or until the pin 29 engages with the vertical edge of either of the lugs 28, as shown in Figure 7. Responsive to a further longitudinal movement of the core, the shaft 17 will be propelled by the pin 29 through a rotary movement and thus carry the arm 24 through a swinging movement either to the right or left as the case may be. It will be apparent that when the parts are in their normal position, as indicated in Figure 6, the arm 24 is locked against lateral swinging movement by the lever member 35.

Preferably concentric with the shaft 17 and having internal screw threads 39, and being preferably integral with the casing, is a socket 40, the latter being adapted to have threaded engagement with the ordinary threaded flange or inlet pipe of an automobile radiator (one form of which is designated by the number 41), to make a leak proof connection therewith. The interior of the socket is in open communication with the inlet passageway 12. By removing the cap 13, water may be supplied to the radiator in the usual manner. The inlet of the extension 11 may be termed an extension of the usual inlet pipe of ordinary automobile radiators.

The indicator arm 24, which may be termed a significatory element, is provided preferably with an illuminated hollow head 42, equipped with a suitable incandescent lamp 43, the arm 24 being hollow or tubular throughout its length, and in open communication with the hollow of the head, as shown in Figure 8 of the drawings. When the arm is in its normal inactive position, as shown in Figure 2 of the drawing, it is suspended directly over and in alinement with the hinge connection $f$, thus not interfering with the opening of the hood members, as indicated in Figure 11. In Figure 10, $g$ designates the usual steering wheel mounted on the steering column $h$, the wheel being here shown carrying on its rim a pair of electric switches 44 and 44'. The helices 7 and 7' surround the core 10, there being one for each of said switches. The switch 44' is connected in circuit with the helix 7', said circuit operating as follows: When the switch 44' is closed; from switch to helix 7', to battery 45, to switch, the lamp 43 being connected in said circuit to be energized thereby. The switch 44 is connected in circuit with the helix 7 and when closed, the circuit will operate from battery 45 to switch, to helix 7, to battery, the lamp again being in circuit to be energized when the switch is closed. By arbitrarily throwing either of the switches to close their respective circuits to which they belong, either of the solenoids 5 may be selectively energized to attract the core longitudinally into the hollow, respectively, of the spools 6, thereby actuating the gear 26 and communicating a swinging motion to the significatory element 24, to the right or left as the case may be, the lamp 43 being simultaneously also energized to effect a signal at night. When desired, an additional signal device may be placed at a conspicuous position at the rear of the automobile.

In Figure 6, 47 designates a wire outlet through which the conductors for the solenoids pass, from whence the conductors may be projected through the hood of the automobile, as at 48 (Figure 2), and thus lead to the steering wheel $g$.

In Figure 5, 49 designates an opening through which the electric conductors for the lamp 43 extend, which conductors pass through the hollow arm 24 to the lamp, it being understood that the lamp conductors between the openings 49 and 50 are sufficiently slack to permit the arm 24 to swing either to the right or left, as indicated in Figure 2 of the drawings. A stop pin 52, here shown, one carried by each of the spools 6, serves to stop the core to restrict the movement of the arm 24 when in signaling position.

In operation, when the switch 44 at the steering wheel is closed by the driver, the solenoid 5 will become energized to draw the core to the left, thus swinging the arm 24 to the right with respect to the driver. Likewise, the closing of the switch 44' will actuate the solenoid 5' and cause the arm to be swung to the left. The significatory element is thus held in direction indicating position as long as the respective circuits are closed by the respective switches.

To return the arm to its normal locked position, the opposite solenoid is momentarily energized by a quick opening and closing movement of the switch to bring it back to its normal rearwardly extending position over the hood of the car. As it approaches its normal position, the locking bar 35 will engage the notch 37, as hereinbefore described, and thus lock the significatory element against swinging movement which might be caused from ordinary vibrations of the car body. As the distance from the point 51 to the outer end of the lever 35 (Figure 7) is appreciably smaller than the distance between said point and the pivot 34, and as the lever 35 engages with or fulcrums against the sides of the lugs 36, a considerable lateral pressure is required to be exerted by the side walls of the notch 37 to cause the cam member 32 to be oscillated about its pivot 33. However, the arm 24 may be grasped by the hand and sufficient force be thus applied to move the core longitudinally. Thus, the lever is yieldingly held in its normal position in a manner to yield to an unusually severe lateral vibration of the automobile body.

I claim:

1. A signal comprising a casing, opposed solenoids disposed therein, a rack-like core reciprocable by the solenoids, a shaft having a locking recess, a signal carried thereby, a gear meshing with the rack teeth of the core mounted on said shaft, means loosely connecting the gear to the shaft to allow a slight relative movement therebetween, a pivoted locking member engageable in the recess of the shaft, and means operable by the core and having operative engagement with the locking member to release said locking member from said locking recess during an actuation of the device and to move said locking member into locking engagement with said recess during a restoration to normal thereof.

2. A signal device, comprising a casing, solenoids mounted therein, a rack-like core reciprocable by the solenoids, signal means pivotally mounted on said casing, means operatively connecting the rack-like core to the signal means, said connecting means having a limited movement independently of said signal means, and means lockingly engaging said signal means when the core is in a normal condition and having operative engagement with said core to be withdrawn from locking engagement with said signal means upon an actuation of said core.

3. A signal device, comprising a casing, solenoids mounted therein, a rack-like core reciprocable by said solenoids, a gear having toothed engagement with said rack pivotally mounted in said casing, a shaft mounted axially of said gear, and connected thereto to have a limited oscillative movement independently of said gear, said shaft having a slot therein, a signal carried by said shaft, a toggle nosed dog pivotally mounted adjacent said shaft to normally engage said slot, a guide fixedly connected to the casing to normally prevent lateral oscillation of the toggle nose of said dog to lock the shaft against rotation, and a pin carried by the rack-like core and having operative engagement with said dog to withdraw the toggle nose thereof from engagement with said slot during a limited oscillative movement of said gear independently of said shaft.

In testimony whereof I affix my signature.

EARL H. PITNEY.